United States Patent
Okazaki et al.

(10) Patent No.: US 7,687,008 B2
(45) Date of Patent: Mar. 30, 2010

(54) METHOD FOR PRODUCING CERAMIC HONEYCOMB FILTER

(75) Inventors: Shunji Okazaki, Yukuhashi (JP); Yasuhiko Ohtsubo, Kitakyushu (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/162,226

(22) PCT Filed: Jan. 29, 2007

(86) PCT No.: PCT/JP2007/051419

§ 371 (c)(1), (2), (4) Date: Jul. 25, 2008

(87) PCT Pub. No.: WO2007/086567

PCT Pub. Date: Aug. 2, 2007

(65) Prior Publication Data

US 2009/0008830 A1    Jan. 8, 2009

(30) Foreign Application Priority Data

Jan. 27, 2006    (JP) ............................. 2006-018350

(51) Int. Cl.
- B06B 1/02 (2006.01)
- B28B 1/00 (2006.01)
- B28B 3/00 (2006.01)
- B28B 5/00 (2006.01)
- C04B 33/32 (2006.01)
- C04B 33/36 (2006.01)
- C04B 35/64 (2006.01)
- B28B 1/08 (2006.01)
- B29C 43/22 (2006.01)

(52) U.S. Cl. .................. 264/442; 264/630; 264/653; 264/69

(58) Field of Classification Search ................. 264/630, 264/631, 442, 653, 666, 69
See application file for complete search history.

(56) References Cited

U.S. PATENT DOCUMENTS

| | | | | |
|---|---|---|---|---|
| 4,519,820 | A | | 5/1985 | Oyobe et al. |
| 5,030,391 | A | * | 7/1991 | Sumita et al. .................. 264/5 |
| 6,673,300 | B2 | * | 1/2004 | Allen et al. .................. 264/400 |
| 6,809,139 | B2 | * | 10/2004 | Fabian et al. ................. 524/430 |
| 7,090,714 | B2 | * | 8/2006 | Otsubo et al. .................. 55/523 |
| 2002/0066982 | A1 | * | 6/2002 | Yamaguchi et al. ......... 264/631 |
| 2003/0161945 | A1 | | 8/2003 | Allen et al. |
| 2004/0047774 | A1 | | 3/2004 | Suwabe et al. |
| 2008/0155952 | A1 | | 7/2008 | Okazaki et al. |

FOREIGN PATENT DOCUMENTS

| JP | 59-028010 B2 | 2/1984 |
|---|---|---|
| JP | 03-232511 A | 10/1991 |

(Continued)

Primary Examiner—Joseph S Del Sole
Assistant Examiner—Ryan Ochylski
(74) Attorney, Agent, or Firm—Sughrue Mion, PLLC

(57) ABSTRACT

A method for producing a ceramic honeycomb filter having large numbers of flow paths partitioned by cell walls, the flow paths having plugs at positions separate from an end surface of the honeycomb filter, comprising the steps of introducing a base-forming material into the flow paths on one end surface side, charging a plug-forming material into flow paths to be provided with plugs from the other end surface side, and sintering it.

7 Claims, 7 Drawing Sheets

FOREIGN PATENT DOCUMENTS

| | | |
|---|---|---|
| JP | 05-123514 A | 5/1993 |
| JP | 06-033739 A | 2/1994 |
| JP | 2004-019498 A | 1/2004 |
| JP | 2004-113930 A | 4/2004 |
| JP | 2004-251266 A | 9/2004 |
| JP | 2004-305993 A | 11/2004 |
| JP | 2004-536692 A | 12/2004 |
| JP | 2005-262210 A | 9/2005 |
| JP | 2006-167680 A | 6/2006 |
| JP | 2006-198603 A | 8/2006 |
| JP | 2006-231103 A | 9/2006 |
| JP | 2006-272183 A | 10/2006 |
| JP | 2006-305503 A | 11/2006 |
| JP | 2006-326586 A | 12/2006 |
| WO | 2004/091756 A1 | 10/2004 |
| WO | 2006/068256 A1 | 6/2006 |

* cited by examiner

METHOD FOR PRODUCING CERAMIC HONEYCOMB FILTER

This application is a 371 of PCT/JP2007/051419 filed Jan. 29, 2007, claiming the priority of Japanese Patent Application No. 2006-018350 filed Jan. 27, 2006, both of which are hereby incorporated by reference in their entirety.

FIELD OF THE INVENTION

The present invention relates to a method for producing a ceramic honeycomb filter suitable for apparatuses for cleaning an exhaust gas from automobile engines, particularly apparatuses for removing particulate matter from an exhaust gas discharged from diesel engines.

BACKGROUND OF THE INVENTION

Used for environmental protection are honeycomb filters for removing carbon-based particulate matter from exhaust gases discharged from diesel engines. The honeycomb filter is alternately sealed on both end surfaces on the exhaust-gas-inlet and exit sides. FIG. 4 shows an example of conventional ceramic honeycomb filters having such structure. This ceramic honeycomb filter 50 is constituted by a porous ceramic honeycomb structure 11 comprising porous cell walls 3 for forming pluralities of flow paths 2a, 2b and a peripheral portion 1a enclosing the porous cell walls 3, plugs 55 for sealing flow paths 2b in a checkerboard pattern in an end portion of the porous ceramic honeycomb structure 11, and plugs 56 for sealing flow paths 2a in the other end portion of the porous ceramic honeycomb structure 11 in such a checkerboard pattern that they do not overlap the plugs 55. The exhaust gas containing particulate matter enters the flow paths 2a through the inlet-side opening end 57, passes through cell walls 3 and adjacent flow paths 2b, and goes out of the exit-side end surface 58. In this case, the particulate matter in the exhaust gas is captured in pores (not shown) in the cell walls 3. As the particulate matter continues captured by the ceramic honeycomb filter 50, pores in the cell walls 3 are clogged, resulting in drastic decrease in a particulate-matter-capturing function, and increase in pressure loss that reduces engine power. The accumulated particulate matter (PM) is combusted by an electric heater, a burner, microwaves, etc., to regenerate the ceramic honeycomb filter 50. The oxidation of the accumulated particulate matter is accelerated by a catalyst carried on the ceramic honeycomb filter 50, to regenerate the ceramic honeycomb filter 50.

Under usual operation conditions of diesel engines, however, high exhaust gas temperatures to combust PM cannot be achieved. Accordingly, investigation has been being conducted on technologies for regenerating the honeycomb filter 50 by accelerating the oxidation of PM by a catalyst carried on the honeycomb filter 50. For instance, a honeycomb filter integrally having a catalyst comprising a platinum-group metal and a rare earth oxide such as cerium oxide carried on alumina, a material having a high specific surface area, has been put into practical use. Using such catalyst-carrying honeycomb filter, a combustion reaction can be accelerated by the catalyst to remove the accumulated PM.

In the honeycomb filter 50 having a conventional structure shown in FIG. 4, however, PM is easily attached to an inlet-side end surface 57 having low catalyst activity, particularly to end surfaces of the inlet-side plugs 55, clogging the inlet-side flow paths 2a of the filter, and thus increasing pressure loss. To make the honeycomb filter easily regeneratable with improved cleaning function, a honeycomb filter 10 having plugs 5 in flow paths at positions separate from the inlet-side end surface 7 as shown in FIG. 1 has been proposed.

JP 3-232511 A discloses a method for plugging a ceramic honeycomb structure on both inlet- and exit-end surfaces in a checkerboard pattern, comprising the steps of attaching a porous sheet to one end surface of the ceramic honeycomb structure, attaching a shield sheet to the other end surface, introducing a ceramic plug material through apertures of the porous sheet into flow paths to positions near the other end surface, and solidifying the ceramic plug material to plug the end portions of the flow paths. However, this method produces a honeycomb filter 50 having the conventional structure shown in FIG. 4, failing to form plugs in the flow paths deep from the end surface.

JP 2004-536692 A discloses a method for forming plugs in an end portion of a flow path by charging ceramic powder slurry from an upper end to a lower end portion. However, this method cannot form plugs in flow paths deep from the end surface, and ceramic powder attached to intermediate portions of the flow paths clogs pores in cell walls, resulting in large pressure loss.

Methods for forming plugs in a honeycomb filter at positions separate from the inlet-side end surface are disclosed by JP 3-68210 B, JP 6-33739 A and JP 2004-19498 A.

The method of JP 3-68210 B comprises, as shown in FIG. 5(a), the steps of sealing ends of flow paths needing no plug in a porous ceramic honeycomb structure 61 with a wax 66, immersing the honeycomb structure 61 in a plug-forming slurry 69 with the inlet-side end 67 downward, and charging the slurry 69 into the flow paths 62 not sealed by the wax. Because the honeycomb structure 61 per se absorbs water, the slurry entering the flow paths 62 is deprived of water more in an upper portion than in a lower portion by the cell walls 64, thereby forming a solidified portion 65a. As shown in FIG. 5(b), when the honeycomb structure 61 is turned upside down, water is removed from the slurry remaining on the solidified portion 65a, the slurry shrinks during solidification. As a result, gaps are provided between the plugs 65 and the end surface 67 of the honeycomb structure. The position of the inlet-side plugs 65 is determined by the amount of slurry introduced into the flow paths 62. However, experiment has revealed that because solidification occurs to a relatively large extent in a lower portion of the slurry 69 charged into the flow paths 62, the solidified slurry remains in a nonnegligible amount on cell walls 64 between the end surface 67 and the solidified portion 65a when the honeycomb structure 61 is turned upside down, resulting in large pressure loss upstream of the inlet-side plugs 65.

JP 3-68210 B also discloses a method for forming inlet-side plugs integral with cell walls by embedding ceramic chips in flow paths of an extrusion-molded honeycomb structure, and sintering them. However, because it is difficult to make the expansion coefficient of the extrusion-molded honeycomb structure completely equal to that of the ceramic chips, gaps are generated between the ceramic chips and cell walls due to expansion and shrinkage by sintering, resulting in a small particulate-matter-capturing effect and insufficient bonding to the cell walls. It has thus been found that plugs are detached, and that the ceramic chips destroy the cell walls.

JP 6-33739 A discloses a method for producing a ceramic honeycomb filter comprising the steps of embedding a first paste containing cordierite powder in flow paths of a honeycomb green body in upstream-side end portions, charging a second paste containing cordierite powder and combustible powder from the side upstream of the first paste to push the first paste by a predetermined distance, and sintering them to remove the combustible powder, thereby forming plugs in the flow paths at upstream positions separate from the end surface. In this method, however, even after the combustible powder in the first paste filling portions upstream of the inlet-side plugs is burned out, the cordierite powder is attached to the cell walls by sintering to some extent, thereby partially clogging pores in the cell walls and thus accelerating the accumulation of particulate matter.

JP 2004-19498 A discloses a method for forming plugs in flow paths of a honeycomb structure deep by a predetermined distance from the upstream-side end surface, by charging an aqueous paste containing cordierite and an organic binder into a syringe having a long needle, and introducing the aqueous paste from the syringe into each flow path alternately with a predetermined depth from the upstream-side end surface. It has been found, however, that cell walls of the flow paths are destroyed by the contacting syringe needle in this method. Also, the paste is solidified in the syringe needle, causing clogging. Further, because the syringe needle is inserted into individual flow paths, an extremely long period of time is needed to form plugs particularly in a large ceramic honeycomb filter having an outer diameter exceeding 150 mm, which has 10000 flow paths or more.

OBJECT OF THE INVENTION

Accordingly, an object of the present invention is to provide a method for surely forming plugs in flow paths of a ceramic honeycomb structure having large numbers of flow paths partitioned by cell walls at positions separate from the end surface in a short period of time.

DISCLOSURE OF THE INVENTION

As a result of intense research in view of the above object, the inventors have found that it is possible to surely form plugs in flow paths at positions separate from the end surface in a short period of time, by introducing a base-forming material into flow paths of a ceramic honeycomb structure on one end surface side, charging a plug-forming material into flow paths to be provided with plugs from the other end surface side, and sintering it. The present invention has been completed based on such finding.

Thus, the method of the present invention for producing a ceramic honeycomb filter having large numbers of flow paths partitioned by cell walls, the flow paths having plugs at positions separate from an end surface of the honeycomb filter, comprises the steps of introducing a base-forming material into the flow paths on one end surface side, charging a plug-forming material into flow paths to be provided with plugs from the other end surface side, and sintering it.

To accelerate the charging of the plug-forming material into the flow paths, the addition of a filling accelerator, and/or mechanical or ultrasonic vibration are preferable.

The plug-forming material is preferably ceramic powder, ceramic granules, or capsules containing ceramic powder slurry.

The outer diameter of the capsule is preferably 90% or less of the inner diameter of the flow pass.

The base-forming material preferably has a viscosity of 5-100 Pa·s. The base-forming material is preferably an aqueous solution of a water-soluble cellulose compound. The water-soluble cellulose compound is preferably at least one selected from the group consisting of methylcellulose, carboxymethylcellulose, hydroxymethylcellulose, hydroxyethylcellulose and hydroxypropylmethylcellulose.

BRIEF DESCRIPTION OF THE DRAWINGS

FIG. 2($b$) is a cross-sectional view schematically showing a step of charging a plug-forming material in the production method of the ceramic honeycomb filter of the present invention.

FIG. 2($c$) is a cross-sectional view schematically showing a step of charging a filling accelerator in the production method of the ceramic honeycomb filter of the present invention.

FIG. 2($d$) is a cross-sectional view schematically showing a step of solidifying the plug-forming material in the production method of the ceramic honeycomb filter of the present invention.

FIG. 2($e$) is a cross-sectional view schematically showing a step of sintering the plug-forming material in the production method of the ceramic honeycomb filter of the present invention.

FIG. 2($f$) is a cross-sectional view schematically showing a step of forming plugs on the other end surface side in the production method of the ceramic honeycomb filter of the present invention.

FIG. 3($b$) is a cross-sectional view showing a latter part of the step shown in FIG. 2($b$) in detail.

FIG. 5($b$) is a cross-sectional view schematically showing another method described in JP 3-68210 B for forming plugs.

DESCRIPTION OF THE PREFERRED EMBODIMENTS

[1] Production Method

Figure 1:
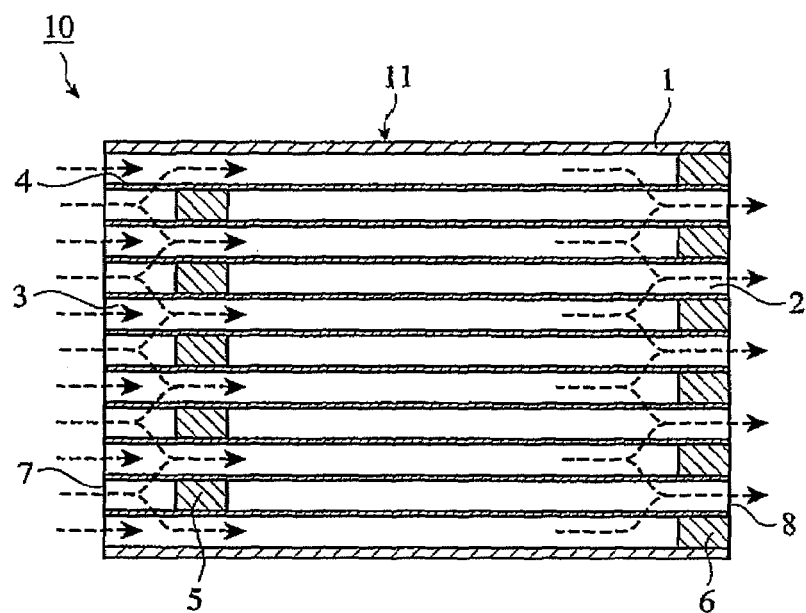
FIG. 1 is a cross-sectional view schematically showing the ceramic honeycomb filter of the present invention.

In a ceramic honeycomb structure having large numbers of flow paths partitioned by cell walls, the method of the present invention for forming plugs in the flow paths at positions separate from the end surface comprises a step of immersing a ceramic honeycomb structure 11 on the side of one end surface 7 in a base-forming material 22 in a container 21, so that the base-forming material 22 enters the flow paths to a predetermined depth on the side of one end surface 7 [FIG. 2($a$)], and a step of charging a plug-forming material 23 into the flow paths 2 to be provided with plugs from the side of the other end surface 8, 50 that the plug-forming material 23 is disposed in the flow paths at a predetermined distance D from one end surface 7 [FIG. 2($b$)]. As shown in FIG. 2($c$), a filling accelerator 24 is preferably introduced. It further comprises a step of heating to remove liquid components from the base-forming material 22 and to make the plug-forming material 23 integral, thereby forming plug-forming bodies 5' in the flow paths 2 at a predetermined distance D from the end surface 7 [FIG. 2(d)], and then a step of sintering the plug-forming bodies 5' to turn them to plugs 5 bonded to cell walls 4 [FIG. 2(f)]. The method of the present invention comprising these steps can form plugs 5 in the flow paths at predetermined positions separate from the end surface in a short period of time.

(1) Plug-Forming Material

The plug-forming material can be heat-resistant ceramic powder or its granules, or capsules containing ceramic powder slurry. Such ceramic powder is preferably made of cordierite, mullite, alumina, zirconia, silicon carbide, silicon nitride, aluminum nitride, titanium nitride, sialon, lithium aluminum silicate, aluminum titanate, or mixtures thereof. From the aspect of adhesion, it is preferable to use ceramic powder having the same composition as that of the ceramic honeycomb structure. The ceramic honeycomb structure is made of, for instance, cordierite comprising kaolin, talc, silica, alumina, etc. in a composition comprising 48-52% by mass of $SiO_2$, 33-37% by mass of $Al_2O_3$, and 12-15% by mass of MgO.

(i) Ceramic Powder and Ceramic Granules

The ceramic powder and its granules preferably have an average particle size of 1-50 μm, such that they are uniformly charged into the flow paths. Particularly the ceramic granules are preferable because of uniform chargeability. Particularly ceramic granules formed by a spray-drying method are preferable.

Figure 2A:
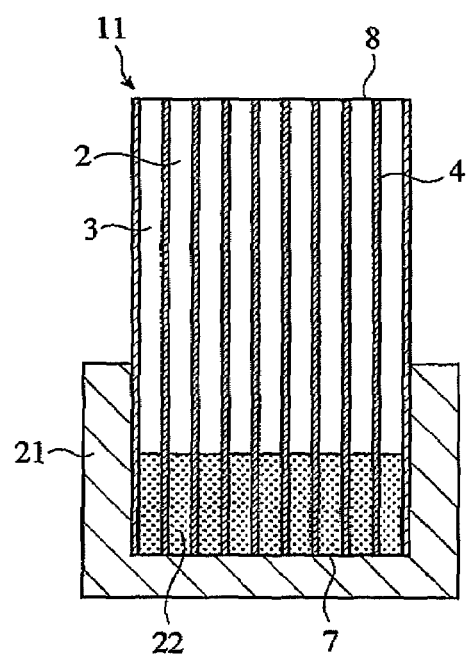
FIG. 2($a$) is a cross-sectional view schematically showing a step of introducing a base-forming material in the production method of the ceramic honeycomb filter of the present invention.
Figure 2B:
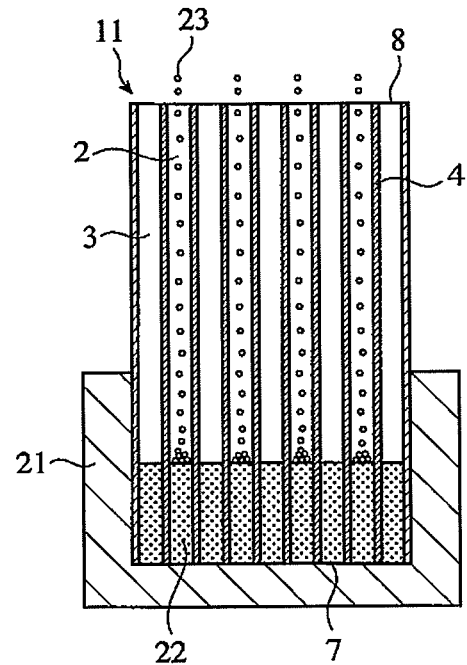
Figure 2C:
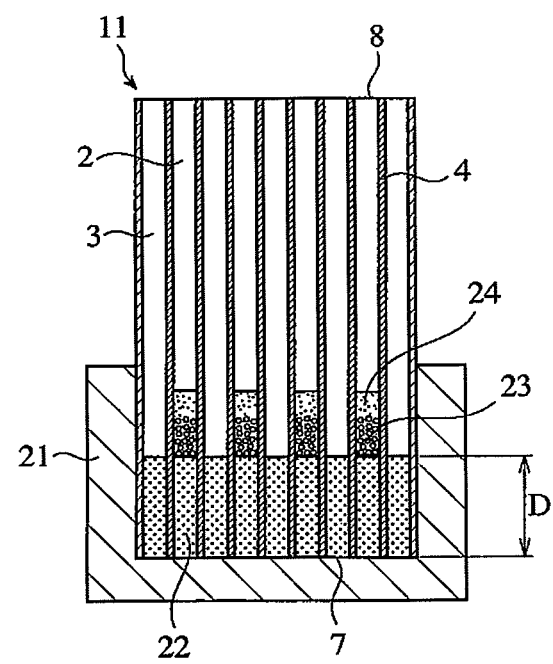
Figure 2D:
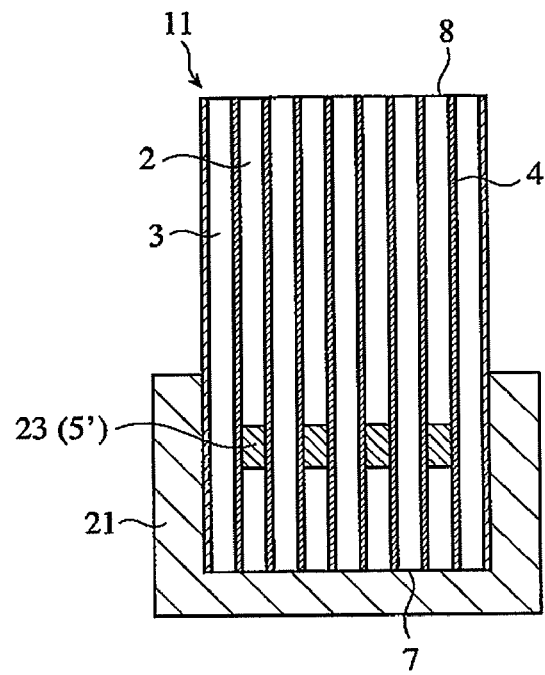
Figure 2E:
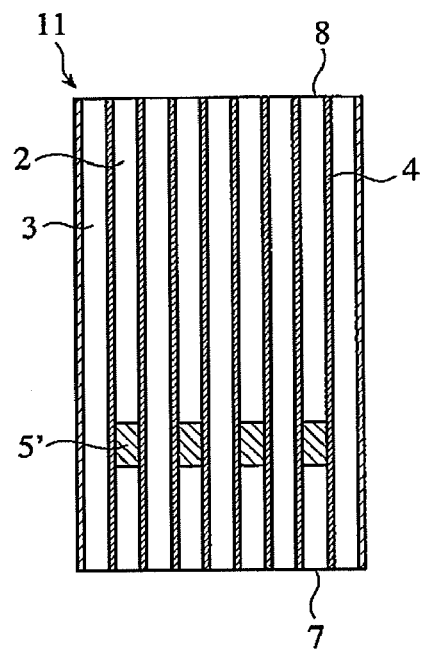
Figure 2F:
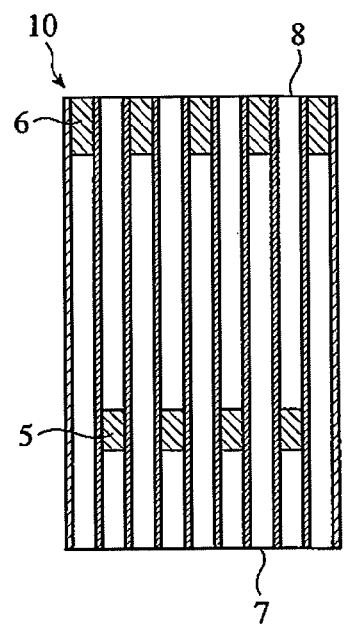

The ceramic powder or its granules preferably contain a binder, such that the plug-forming material is self-supportable after heat-drying the base-forming material 22 and until sintering [between the step in FIG. 2(d) and the step in FIG. 2(e)]. The binder is preferably methylcellulose, hydroxypropylmethylcellulose, etc., and the binder content in the plug-forming material is preferably 1-10% by mass.

(ii) Capsule Containing Ceramic Powder Slurry

The capsule containing ceramic powder slurry as a plug material preferably has a skin layer as thick as 50-200 μm, which is made of gelatin, agar, glycerin, etc. The skin layer is preferably lined with a protective layer for preventing the leak of the slurry. The capsule preferably has an outer diameter, which is 90% or less of the inner diameter of the flow path. When the outer diameter exceeds 90% of the inner diameter of the flow path, the flow paths are clogged with the capsules, so that the capsules cannot be disposed at predetermined positions. The outer diameter is more preferably 70% or less of the inner diameter of the flow path. The slurry in the capsule preferably contains the same ceramic powder as described above. The slurry concentration is determined such that the slurry can easily flow out of the capsule after melting the skin layer.

After charging the capsules, the base-forming material is heated to melt the capsule skin layer, so that the plug material slurry stays on the base-forming material 22 in the flow paths. With water evaporated, the slurry is solidified. The use of capsules containing the plug material slurry prevents the slurry from attaching to intermediate portions of porous ceramic cell walls of flow paths, thereby avoiding the clogging of pores (increase in pressure loss).

(2) Base-Forming Material

The base-forming material is preferably such a material that can be easily charged into the flow paths of the ceramic honeycomb structure, that is not easily absorbed by the cell walls of the ceramic honeycomb structure, that the plug-forming material accumulated thereon does not sink, and that leaves no ash after combustion. It is preferably an aqueous solution of a high-water-retention, organic compound, particularly an aqueous solution of a water-soluble cellulose compound such as methylcellulose, carboxymethylcellulose, hydroxymethylcellulose, hydroxyethylcellulose, hydroxypropylmethylcellulose, etc. The viscosity of the base-forming material is preferably 5-100 Pa·s, more preferably 5-20 Pa·s, such that the base-forming material is not easily absorbed by the cell walls of the ceramic honeycomb structure. To obtain such viscosity, the aqueous water-soluble cellulose compound solution preferably has a concentration of about 1-10% by mass, for instance, about 2% by mass, though variable depending on the type of the water-soluble cellulose compound. Using such a high-viscosity base-forming material, the plug-forming material accumulated on the base-forming material does not sink into the base-forming material.

(3) Acceleration of Charging

The charging of the plug-forming material into the flow paths is preferably accelerated by the addition of a filling accelerator, mechanical or ultrasonic vibration, etc. The accelerated charging makes the plug-forming material uniform in the flow paths, thereby increasing the strength of the plugs after sintering. The filling accelerator may be water, alcohols, glycerin, surfactants, or mixtures thereof. When or after adding the filling accelerator, mechanical or ultrasonic vibration is more preferably conducted. Because water and/or alcohol added as the filling accelerator are absorbed by the cell walls in a relatively short period of time after making the plug-forming material uniform, the plug-forming material does not sink into a softened base-forming material.

[2] Ceramic Honeycomb Filter

As shown in FIG. 1, the ceramic honeycomb filter 10, which is obtained from a ceramic honeycomb structure having large numbers of flow paths partitioned by cell walls and made of titanate aluminum as a main crystal by plugging the flow paths by the method of the present invention, is constituted by a porous ceramic honeycomb structure 11 comprising porous cell walls 4 forming pluralities of flow paths 2, 3 and a peripheral portion 1, and plugs 5, 6 sealing end portions of the flow paths 2, 3 alternately in a checkerboard pattern. An exhaust gas containing particulate matter enters the flow paths 3 through an inlet-side opening 7, passes through the cell walls 4 and the adjacent flow paths 2, and goes out of an exit-side end 8. During this, particulate matter in the exhaust gas is captured by pores (not shown) in the cell walls 3.

The present invention will be explained in more detail referring to Examples below without intention of restricting the present invention thereto.

EXAMPLE 1

As shown in FIG. 1, a honeycomb filter 10 having large numbers of rectangular-cross-sectioned flow paths 2, 3 partitioned by cell walls 3 inside a peripheral wall 1, the end portions 7, 8 of the flow paths 2, 3 being sealed by plugs 5, 6 in a checkerboard pattern, and the plugs 5 being located in the flow paths at positions separate from the inlet-side end surface 7 was produced by the flowing steps.

Kaolin powder, talc powder, silica powder and alumina powder were mixed to provide a powdery cordierite-forming material having a composition comprising 50% by mass of $SiO_2$, 35% by mass of $Al_2O_3$ and 15% by mass of MgO. After this powdery cordierite-forming material was mixed with methylcellulose and hydroxypropylmethylcellulose as a binder, and graphite particles as a lubricant and a pore-forming material, water was added, and full blending was conducted to produce a moldably plasticized ceramic material. This moldable ceramic material was extruded and cut to obtain a honeycomb structure green body. This green body was dried and sintered to obtain a cordierite honeycomb structure 11 having a porosity of 65%, an average pore size of 20 μm, a cell wall thickness of 0.3 mm, a cell wall pitch of 1.5 mm, an outer diameter of 280 mm and a total length of 310 mm.

Figure 3A:
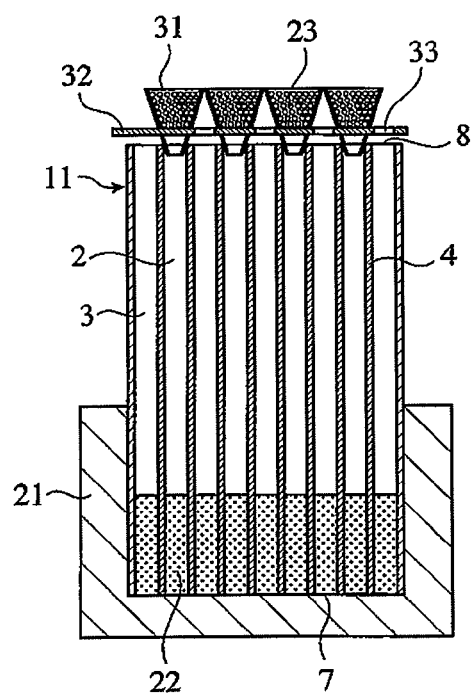
FIG. 3($a$) is a cross-sectional view showing a former part of the step shown in FIG. 2($b$) in detail.
Figure 3B:
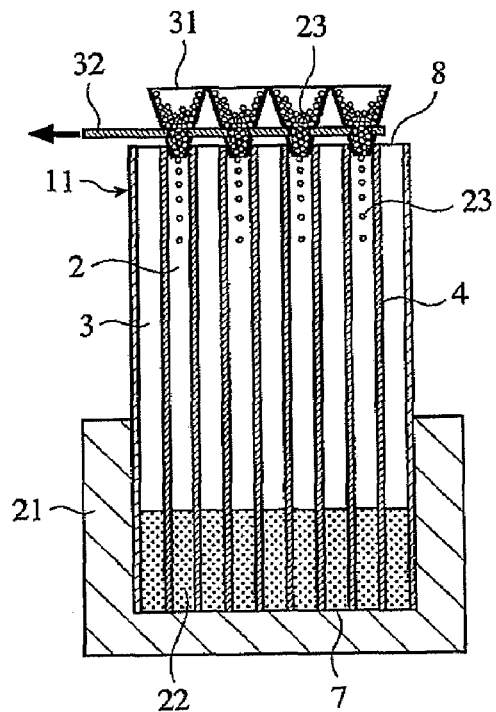
Figure 4:
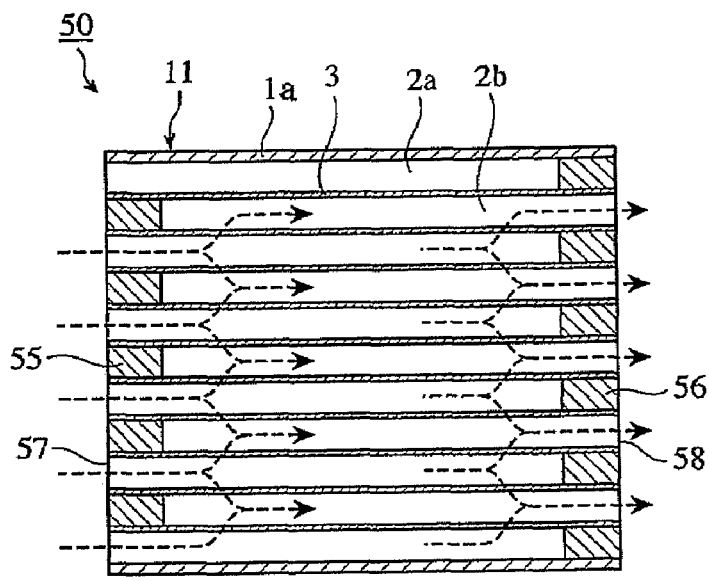
FIG. 4 is a cross-sectional view schematically showing a conventional ceramic honeycomb filter.
Figure 5A:
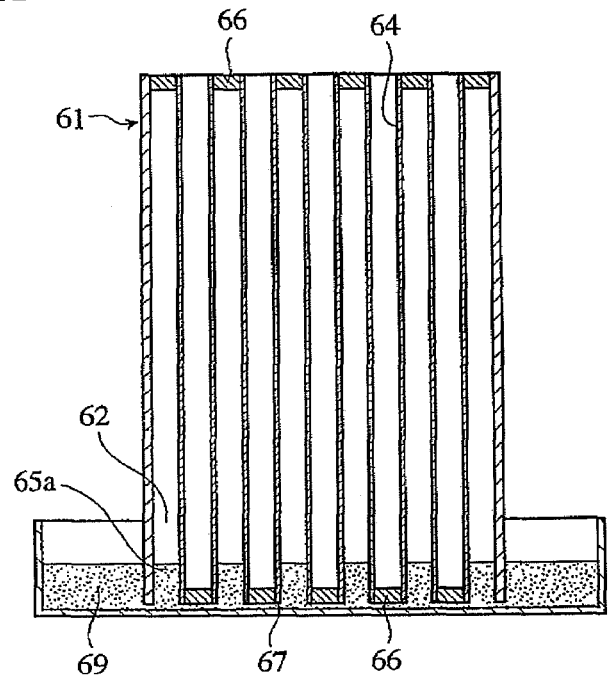
FIG. 5($a$) is a cross-sectional view schematically showing one method described in JP 3-68210 B for forming plugs.
Figure 5B:
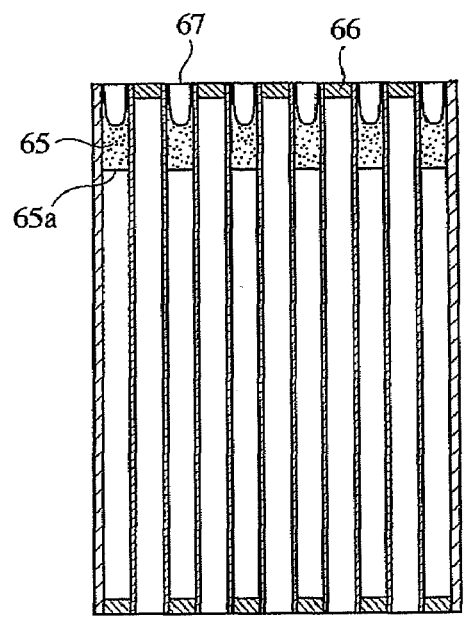

As shown in FIG. 2(a), a portion of the honeycomb structure 11 on the side of the end surface 7 was immersed in a base-forming material 22, a 2-%-by-mass aqueous methylcellulose solution having a viscosity of 10 Pa·s in a container 21. As shown in FIG. 3(a), metering means 31 were disposed on the flow paths 2 to be provided with plugs 5 at the other end surface (upper end surface) 8, and a predetermined amount of a plug-forming material 23 was introduced into the metering means 31. The plug-forming material 23 was a cordierite-forming material in the form of granules, which comprised kaolin powder having an average particle size of 5 μm, talc powder having an average particle size of 15 μm, silica powder having an average particle size of 25 μm, and alumina powder having an average particle size of 7 μm, such that it had a composition having 50% by mass of $SiO_2$, 35% by mass of $Al_2O_3$ and 15% by mass of MgO. As shown in FIG. 3(a), opening a shutter 32 disposed at a bottom of the metering means 31, the ceramic granules in the metering means 31 were discharged from an opening 33 of the shutter 32 and introduced into the flow paths 2. After removing the metering means 31, an aqueous solution of a commercially available polycarboxylic acid surfactant as a filling accelerator 24 was introduced into the flow paths 2 [FIG. 2(c)]. The honeycomb structure 11 placed in the container 21 was heated at 150° C. to remove water from the base-forming material 22 and the filling accelerator 24 [FIGS. 2(d) and 2(e)], thereby forming plug-forming bodies 5' in the flow paths at positions separate from one end surface.

Figure 6:
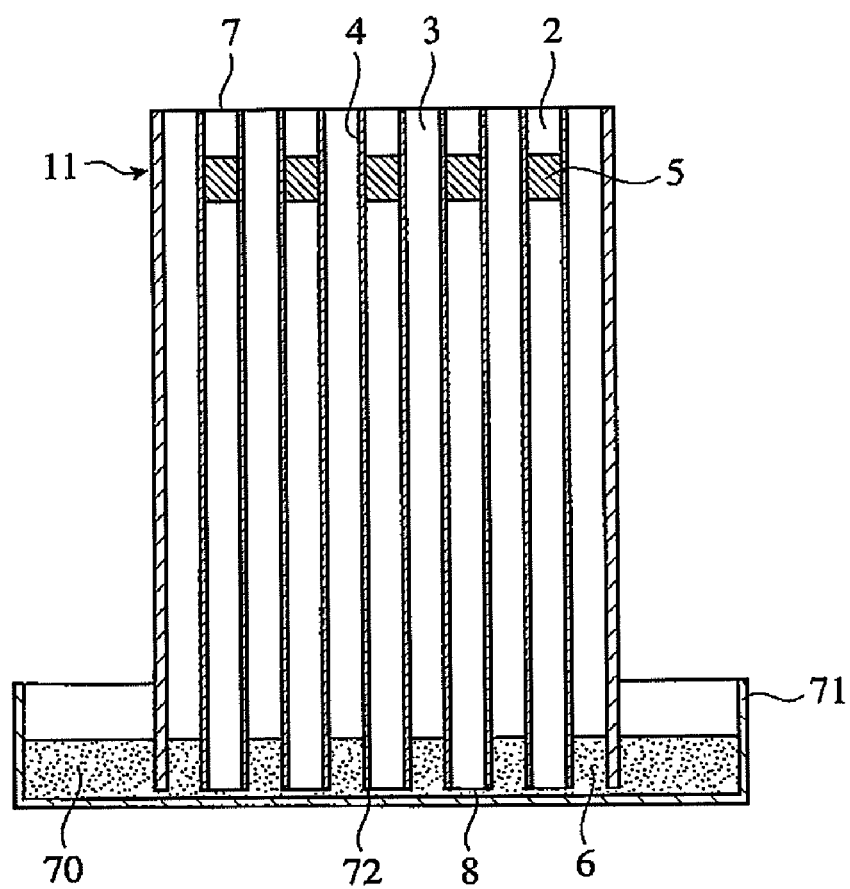
FIG. 6 is a cross-sectional view schematically showing a further method for producing the ceramic honeycomb filter of the present invention.

As shown in FIG. 6, a sealing film 72 was attached to the other end surface 8 of the honeycomb structure 11, and provided with holes at positions corresponding to the flow paths 3 to be provided with plugs in a checkerboard pattern by a laser. Part of the honeycomb structure 11 was immersed in a plug material slurry 70 in a vessel 71 with the other end surface 8 downward, to form plugs 6 in the flow paths 3 adjacent to the other end surface 8 [FIG. 2(f)]. The resultant ceramic honeycomb structure 11 was sintered at a maximum temperature of 1400° C. to obtain a cordierite honeycomb filter 10.

By the above steps, plugs 5 were surely formed in the flow paths of the ceramic honeycomb structure 11 at positions separate from the end surface in a short period of time. Although the plugs 6 were formed after the formation of the plugs 5 in this Example, the formation of the plugs 5 may follow that of the plugs 6.

EXAMPLE 2

A cordierite honeycomb filter 10 was produced in the same manner as in Example 1, except that after changing an aqueous surfactant solution into the flow paths 2, ceramic granules were uniformly introduced while giving vibration of 100 Hz for 20 seconds to the honeycomb structure 11. By this method, plugs 5 were surely formed in the flow paths of the ceramic honeycomb structure at positions separate from the end surface in a short period of time.

EXAMPLE 3

A cordierite honeycomb filter 10 was produced in the same manner as in Example 1, except for using capsules (outer diameter: 1.0 mm, skin layer thickness: 100 μm) containing aqueous cordierite powder slurry as a plug-forming material in a skin layer and an oily, protective, inner layer, and heating the honeycomb structure 11 at 150° C. without using a filling accelerator to melt the capsules to permit the slurry to enter the flow paths. By this method, plugs were surely formed in the flow paths of the ceramic honeycomb structure at positions separate from the end surface in a short period of time.

COMPARATIVE EXAMPLE 1

Using the method described in JP 2004-19498 A, plugs were formed in cells of the same cordierite ceramic honeycomb structure 11 as used in Example 1 alternately at positions inward from the upstream-side end surface 7 by introducing an aqueous cordierite powder slurry by a syringe needle. This method took an extremely long period of time to form the plugs. Also, some of flow paths in the resultant ceramic honeycomb filter were free from plugs.

EFFECT OF THE INVENTION

The method of the present invention can surely form plugs in flow paths to be sealed in a ceramic honeycomb structure at positions separate from the end surface.

The invention claimed is:

1. A method for producing a ceramic honeycomb filter having large numbers of flow paths partitioned by cell walls, said flow paths having plugs at positions separate from an end surface of said honeycomb filter, comprising the steps of sintering a green body of said honeycomb filter, introducing a base-forming material into said flow paths on one end surface side, charging a plug-forming material into flow paths to be provided with plugs from the other end surface side, and sintering the plug-forming material, wherein said base-forming material is an aqueous solution having a viscosity of 5-100 Pa·s.

2. The method for producing a ceramic honeycomb filter according to claim 1, wherein the charging of said plug-forming material is accelerated.

3. The method for producing a ceramic honeycomb filter according to claim 2, wherein the acceleration of the charging of said plug-forming material is conducted by the addition of a filling accelerator, and/or by mechanical or ultrasonic vibration.

4. The method for producing a ceramic honeycomb filter according to claim 1, wherein said plug-forming material is ceramic powder, ceramic granules, or capsules containing a ceramic powder slurry.

5. The method for producing a ceramic honeycomb filter according to claim 4, wherein the outer diameter of said capsules is 90% or less of the inner diameter of said flow paths.

6. The method for producing a ceramic honeycomb filter according to claim 1, wherein said base-forming material is an aqueous solution of a water-soluble cellulose compound.

7. The method for producing a ceramic honeycomb filter according to claim 6, wherein said water-soluble cellulose compound is at least one selected from the group consisting of methylcellulose, carboxymethylcellulose, hydroxymethylcellulose, hydroxyethylcellulose and hydroxypropylmethylcellulose.

\* \* \* \* \*